United States Patent [19]

Thorn

[11] Patent Number: 4,709,907
[45] Date of Patent: Dec. 1, 1987

[54] QUIET FLUID FILLED VIBRATION ISOLATOR

[76] Inventor: Richard P. Thorn, Lord Corporation, 1635 W. 12th St., Erie, Pa. 16512

[21] Appl. No.: 824,367

[22] Filed: Jan. 30, 1986

[51] Int. Cl.⁴ ...................... F16F 15/04; B60G 15/04; F16M 13/00
[52] U.S. Cl. ................................ 267/140.1; 248/562; 267/195
[58] Field of Search .............. 267/8 R, 35, 63 R, 136, 267/140.1, 141, 141.2, 153; 188/268, 298; 180/300; 248/559, 562, 636

[56] References Cited

U.S. PATENT DOCUMENTS

| | | | |
|---|---|---|---|
| 2,587,016 | 2/1952 | Watts | 267/64 |
| 3,013,583 | 12/1961 | Stanley | 138/43 |
| 3,424,448 | 1/1969 | Chak Ma | 267/35 |
| 3,556,156 | 1/1971 | Fuller | 138/43 |
| 3,888,450 | 6/1975 | Seilenbinder | 248/358 |
| 3,938,625 | 2/1976 | Radermacher et al. | 188/1 B |
| 4,011,929 | 3/1977 | Jeram et al. | 188/268 |
| 4,085,832 | 4/1978 | Gaines et al. | 188/268 |
| 4,159,091 | 6/1979 | Le Salver et al. | 248/562 |
| 4,262,886 | 4/1981 | Le Salver et al. | 267/8 R |
| 4,422,779 | 12/1983 | Hamaekers et al. | 384/99 |

FOREIGN PATENT DOCUMENTS

| | | | |
|---|---|---|---|
| 3347274 | 7/1985 | Fed. Rep. of Germany | 267/8 R |
| 59-47541 | 3/1984 | Japan | 267/140.1 |
| 2104619A | 6/1982 | United Kingdom . | |

OTHER PUBLICATIONS

SAE Technical Paper Series, No. 840259, 1984, Marc Bernuchon "A New Generation of Engine Mounts".

*Primary Examiner*—Andres Kashnikow
*Assistant Examiner*—Robert J. Oberleitner

[57] ABSTRACT

A fluid filled vibration isolator of the type having upper and lower chambers separated by a partition having an inertia track passageway and a decoupler assembly permitting fluid to bypass the inertia track passageway at certain amplitudes. The decoupler assembly includes a mass of particulate matter loosely contained within a screened cavity in the partition. The particulate matter has a predetermined density and interstitial volume and occupies less than the entire cavity when at rest therein. At low amplitudes of vibration, the particulate matter oscillates in a dispersed condition as the fluid oscillates through the screened cavity essentially bypassing the inertia track passageway between the chambers. As the amplitude of vibrations increases beyond a certain level, the particulate matter compacts alternately against the screens to throttle flow therethrough and thereby cause the fluid to oscillate in the inertia track passageway.

17 Claims, 6 Drawing Figures

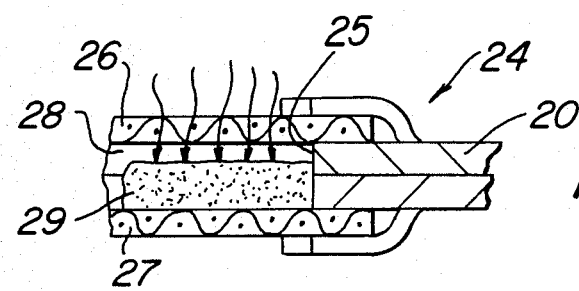
FIG. 3A
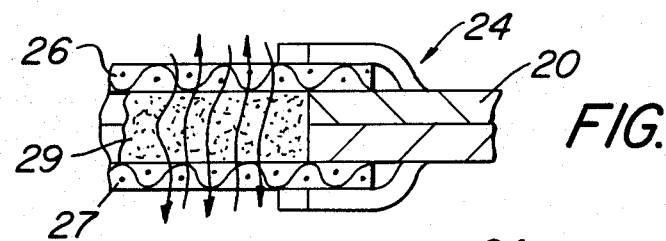
FIG. 3B
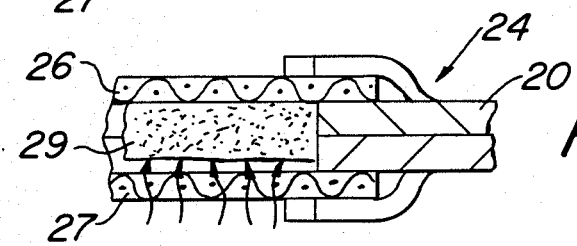
FIG. 3C
FIG. 4
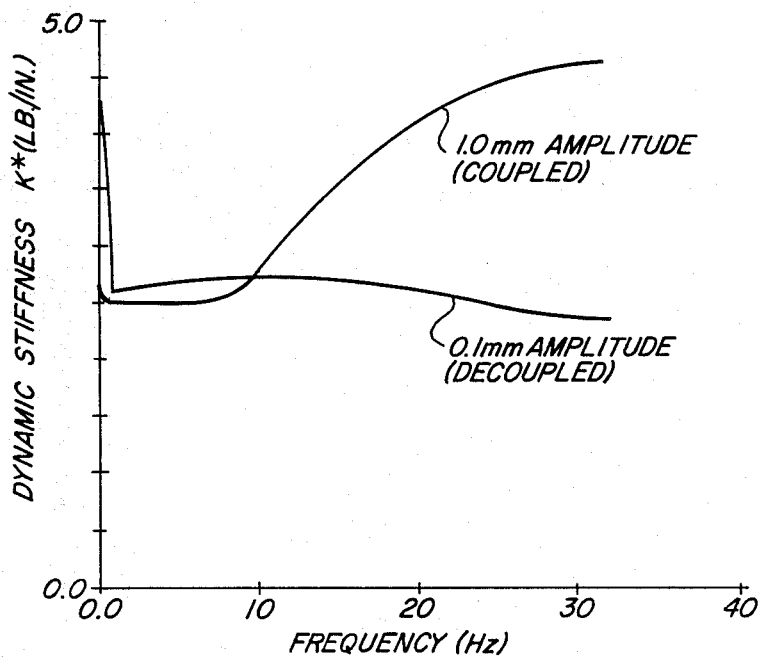

QUIET FLUID FILLED VIBRATION ISOLATOR

FIELD OF THE INVENTION

The present invention relates to fluid filled vibration isolators, and more particularly, the present invention relates to fluid filled vibration isolators of the type which utilize an inertia track passageway in combination with a decoupler element to control fluid motion between a pair of opposed chambers in response to vibrations.

BACKGROUND OF THE INVENTION

In recent years there has been an increased emphasis in the use of fluid filled vibration isolators for various applications. For instance, the advent of lighter weight automobile components has generated a need for greater precision in the control of vibrations induced by normal power plant oscillations and road conditions. Because of the capability of such isolators to be designed to operate with precision, they are particularly useful in mounting engines and transmissions in modern automobiles.

The typical fluid filled vibration isolator includes a pair of opposed flexible wall chambers separated by a partition having a passage providing fluid communication between the chambers. In some fluid filled vibration isolators of this type, the passage is provided by a so-called inertia track passageway providing fluid communication in an arcuate path between the chambers. Fluid oscillates in the inertia track to provide desired dynamic stiffness characteristics at certain excitation frequencies. An example of such an isolator is disclosed in U.S. Pat. No. 4,262,886.

U.S. Pat. No. 4,159,091 discloses a fluid filled vibration isolator which utilizes disc-like elements and diaphragms mounted in a passage located between opposed fluid filled chambers. The disc-like element moves in response to flexure of the chamber walls and alternating pressurization of the fluid contained therein to achieve desired dynamic stiffness characteristics.

U.S. Pat. No. 4,422,779 is exemplary of a fluid filled vibration isolator which incorporates both an inertia track passage and a movable element, or decoupler, as the term is used in the art, to obtain the desired dynamic stiffness. In this type vibration isolator, the movable element which may be either a diaphragm or a disc, cooperates with the inertia track to automatically couple and decouple the inertia track with the chambers. For instance, at low amplitudes of vibration, the movable element, or decoupler, simply oscillates in response to fluid flow oscillations between the chambers, and the inertia track is relatively quiescent, or decoupled. At greater amplitudes of vibration, however, the decoupler requires all the excess fluid volume to flow through the inertia track, thereby coupling the chambers. This type vibration isolator has a relatively low dynamic stiffness at low amplitudes of vibration over a broad range of excitation frequencies and higher dynamic stiffness at higher amplitudes with regions of minimum dynamic stiffness at certain low and high excitation frequencies.

For a more complete discussion of the structure and operational characteristics of fluid filled vibration isolators, reference is made to an article entitled *A New Generation of Engine Mounts*, by Marc Bernuchon, SAE Technical Paper Series 840259, 1984, the disclosure of which is incorporated by reference herein.

While vibration isolators of the type just described have certain advantages, they also have certain limitations. For example, decoupler discs are generally fabricated of rigid materials as are the cavities in which they are mounted, and such discs tend to seat abruptly under certain operating conditions. As a result, disc-type decouplers tend to generate an audible noise in operation, and this is not desirable in a commercially satisfactory fluid filled vibration isolator.

Decouplers of the diaphragm type are quieter, but they have certain limitations. For instance, such decouplers are not as fatigue resistant as disc-type decouplers. Furthermore, diaphragm type decouplers do not afford the same degree of operational precision as provided by disc-type decouplers.

U. K. Patent Specification No. 2,104,619A discloses a fluid filled vibration isolator utilizing a porous mass constrained between screens to throttle flow between chambers continuously. This isolator does not have an inertia track, nor does it have a decoupler. The porous mass provides a constant resistance to fluid flow.

OBJECT OF THE INVENTION

With the foregoing in mind, a primary object of the present invention is to provide an improved fluid filled vibration isolating device of the type utilizing an inertia track in combination with decoupling means.

Another object of the present invention is to provide a novel fluid filled vibration isolating device which operates quietly over its full range of design conditions.

A further object of the present invention is to provide a smooth-acting, gradually-bottoming decoupler assembly for a fluid filled vibration isolator.

As yet another object, the present invention provides a simple, durable, reliable, and inexpensive decoupler assembly for use in combination with fluid filled vibration isolators having inertia tracks.

As a still further object, the present invention provides a unique means for positively and quietly coupling and decoupling an inertia track with opposed chambers in a fluid filled vibration isolator.

The present invention also provides a decoupler assembly that is resistant to fatigue failure.

SUMMARY OF THE INVENTION

More specifically, in the present invention a vibration isolating device having a housing with at least one flexible wall, a partition dividing the housing into at least two chambers for containing a working fluid, and an inertia track providing fluid communication between the chambers is provided with quiet-acting decoupling means cooperable with the inertia track to control fluid flow between the chambers. The decoupling means includes means providing a passage in fluid communication with both chambers, foraminous means defining a cavity in the passage, and a mass of particulate matter loosely contained within the cavity and displaceable between a dispersed condition providing low resistance to fluid flow between the chambers and a compacted condition providing high resistance to fluid flow therebetween. The particulate matter includes particles of a predetermined density and packability occupying less than the full volume of the cavity. The decoupling means decouples the inertia track by permitting the particles to flow freely in a dispersed condition in the cavity in response to low amplitude oscillations, and at certain higher amplitudes of oscillations, the decoupling means couples the chambers via the inertia track by causing the particles to compact against the foraminous means. Coupling and decoupling occurs quietly and gently.

BRIEF DESCRIPTION OF THE DRAWINGS

The foregoing and other objects, features and advantages of the present invention should become apparent from the following description when taken in conjunction with the accompanying drawings, in which:

FIGS. 3A-3C are enlarged fragmentary crosssectional views illustrating the decoupling means of the present invention in several stages of operation; and FIG. 4 is a graph illustrating certain operating characteristics of the fluid filled vibration isolator of the present invention.

DESCRIPTION OF THE PREFERRED EMBODIMENT

Figure 1:
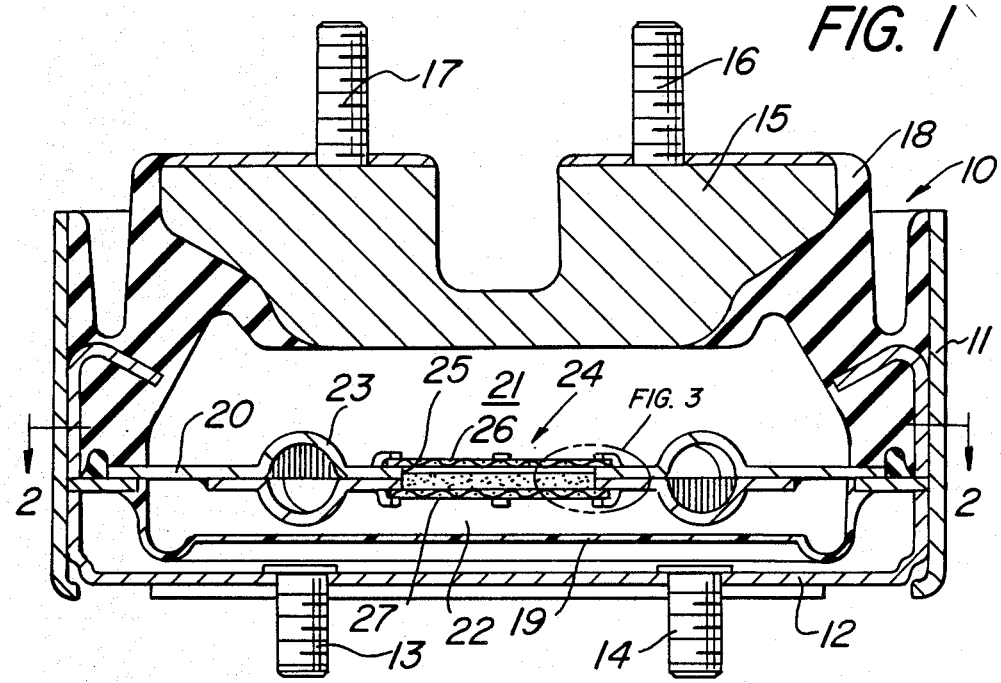
FIG. 1 is a transverse vertical sectional view of a fluid filled vibration isolator embodying the improved decoupling means of the present invention.

Referring now to the drawings, FIG. 1 illustrates a fluid filled vibration isolator 10 which embodies the present invention. The isolator 10 includes a housing 11 having a rigid bottom wall 12 with a plurality of threaded mounting studs 13, 14 depending therefrom. A rigid upper wall 15 with a plurality of projecting threaded mounting studs 16 and 17 is connected to the sides of the housing 11 by a convex block of molded elastomeric material 18 which flexes and permits the upper wall 15 to oscillate vertically with respect to the housing 11. A lower flexible wall 19 of elastomeric material extends across the housing 11 above and substantially parallel to the lower wall 12. A partition 20 extends across the housing 11 and defines with the upper wall 15 and the flexible elastomeric block 18 an upper primary, or working, fluid tight pumping chamber 21 filled with a substantially incompressible fluid (not shown) such as a mixture of ethylene glycol and water. The partition 20 defines with the lower flexible wall 19 a lower secondary, or expansion, fluid tight chamber 22 which expands and contracts in the normal course of operation of the isolator 10 for receiving working fluid displaced from the upper chamber 21.

Figure 2:
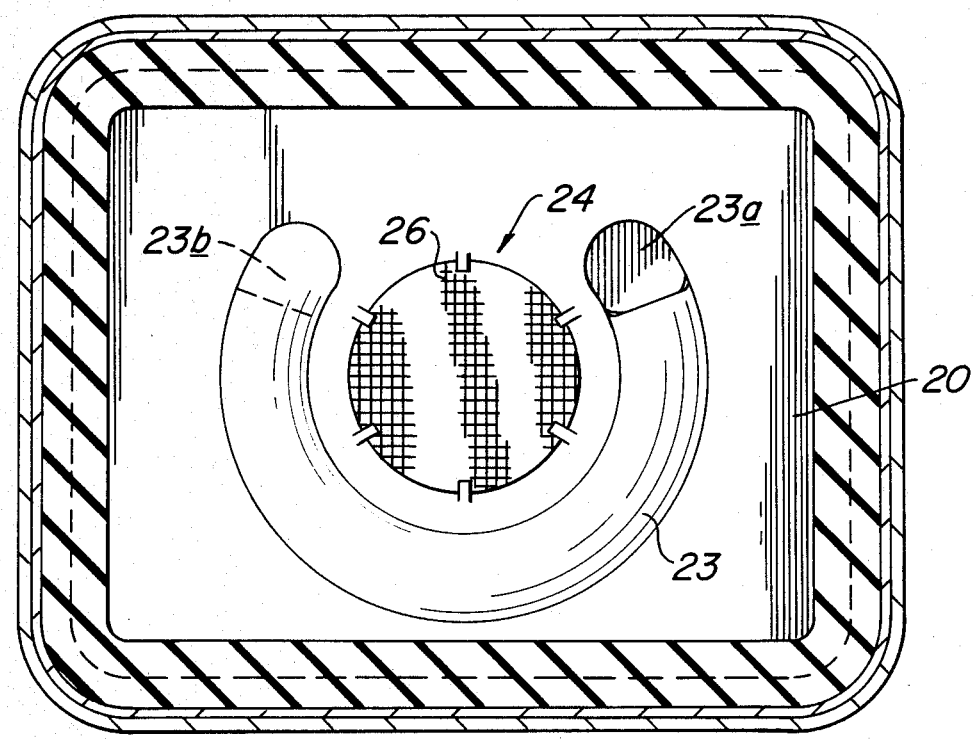
FIG. 2 is a cross-sectional view taken on line 2—2 of FIG. 1.

For the purpose of providing fluid communication between the upper primary working chamber 21 and the lower secondary expansion chamber 22, a so-called inertia track passageway 23 is provided. As best seen in FIG. 2, the inertia track passageway 23 is arcuate and has a substantially uniform cross-section, illustratively of circular shape throughout its entire length. The inertia track passageway 23 has a port 23a at one end opening into the upper chamber 21 and a port 23b at its opposite end opening into the lower chamber 22. The dimensions of the inertia track passageway affect the mass of fluid contained therein and thus affects the resonant frequency of the fluid effect of the isolator 10.

During operation, oscillating movement of the upper wall 15 relative to the partition 20, as by movement of a member connected to its studs 16, 17, causes working fluid to oscillate in the inertia track passageway 23 between the primary chamber 21 and the secondary chamber 22. A vibration isolator of this construction may have a minimum complex dynamic stiffness at a relatively low excitation frequency and over a relatively narrow range of frequencies. For many applications, it is desirable for the inertia track passageway 23 to be relatively inactive, or decoupled, at small amplitudes of excitation, and active, or coupled, at higher amplitudes of excitation over a range of frequencies.

In order to couple and decouple the inertia track passageway 23 and the upper and lower chambers 21 and 22 at certain amplitudes of vibration, it is known to provide decoupling means in the partition. As discussed heretofore, the conventional decoupling means includes a cylindrical passage extending through the partition 20, and may include either a diaphragm therein (not shown) or a disc, slightly smaller in size than the passage, mounted therewithin for oscillation between upper and lower annular seating elements in response to vibrations of a certain amplitude. Amplitudes of vibration in excess of a predetermined small level cause either the diaphragm or the disc to seat against either its upper annular seat or its lower annular seat for blocking flow through the passage and thereby requiring all fluid to flow in the inertia track 23 between the chambers 21 and 22.

As described thus far the vibration isolator 10 is of conventional construction. Because the discs are fabricated of rigid materials, and the seating elements of metal, such decouplers generate audible noises as the decoupling element seats under certain operating conditions. Such noises are undesirable. Diaphragm decouplers are quieter but have other limitations.

The present invention provides improved decoupling means 24 which functions quietly to couple and decouple the inertia track, and which is simple, durable, reliable and relatively inexpensive to produce. To this end, the decoupling means 24 of the present invention operates quietly by utilizing a mass of particulate matter of predetermined characteristics in combination with foraminous means to control fluid flow instead of using a solid decoupler disc as in the prior art. This enables the decoupler to provide a variable resistance to fluid flow and hence to provide a smooth throttling action with low impact energy.

As best seen in FIG. 1, the decoupler means 24 of the present invention includes a passage 25 extending completely through the partition 20 to provide direct fluid communication between the upper and lower chambers 21 and 22. A pair of foraminous means, in the present instance, upper and lower screens 26 and 27, respectively, are mounted in the partition 20 and define therebetween a cavity 28 (FIG. 3A). A mass of particulate matter 29 is loosely contained within the cavity 28 and preferably, when at rest, occupies not more than about 80% of its volume. Thus, the particulate matter 29 is loosely contained in the cavity and is capable of being displaced between the compacted condition illustrated in FIGS. 3A and 3C and the dispersed condition illustrated in FIG. 3B to control fluid flow through the passage 25.

When the particulate matter is in the compacted condition engaged with the lower screen 27, as illustrated in FIG. 3A, the particulate matter 29 substantially completely blocks flow across the partition 20 between the upper and lower chambers, 21 and 22, and thereby couples the same via the inertia track 23. When the particulate matter 29 is in the dispersed condition illustrated in FIG. 3B, however, fluid is permitted to oscillate directly between the upper and lower chambers 21 and 22, and the inertia track 23 is effectively decoupled. When the particulate matter is compacted against the upper screen, as illustrated in FIG. 3C, flow through the passage 25 is blocked and the inertia track 23 thus coupled. While a complete blockage of fluid flow through the decoupler means 24 is desirable, slight leakage is permissible, provided a sufficient pressure drop exists across the compacted particulate matter 29, at least for certain applications.

To insure satisfactory operation of the decoupling means, it is preferable for the particles composing the particulate matter to have a density corresponding substantially to the density of the working fluid contained in the chambers. A desirable working fluid is water containing anti-freeze additives such ethylene glycol, and the like. Thus, the particles should have a specific gravity approaching unity. Particles substantially denser than the density of the working fluid are not as desirable; however, because of their inertia and lack of buoyancy, denser particles may be used to tune the resonant frequency of the decoupler.

When the particles have a specific gravity approaching unity, the particles are buoyant in the working fluid and are displaceable in the working fluid between a dispersed condition substantially disengaged from the foraminous means providing low resistance to fluid flow between the chambers and a compacted condition when the particles are engged with the foraminous means providing high resistance to fluid flow between the chambers. Preferred particles include glass, plastic, elastomeric and mineral materials of various regular and irregular shapes, including spherical, planar and polygonal configurations.

The particulate matter must possess a certain maximum void volume in order to function satisfactorily to block fluid flow. Void volume is essentially a measure of the interstitial space among the particles composing the particulate matter, and hence provides a good indication of its flow blocking capability. In tests conducted with a mass of glass spheres 1 mm. in diameter, the void volume constituted about 30% to about 50% of the packed volume of the mass of spheres, and the decoupler functioned satisfactorily. Greater void volumes would not be desirable because they may not provide satisfactory flow blocking. Other particulate matter providing an equivalent flow blocking action to 1 mm. glass spheres should function satisfactorily.

In the illustrated embodiment, the particulate matter is contained between a pair of foraminous elements, or screens, the size of holes in which must be smaller than that of the particulate matter contained therebetween to prevent its loss and to ensure flow blocking compaction. If desired, other foraminous or perforate means may be utilized to contain the particulate matter including labyrinths, foams, slits, and the like, provided they clear readily in response to fluid back flows.

The particulate matter may be homogenous or may include a non-homogenous mixture of different types of particles. For instance, such a mixture may include combinations of glass and plastic beads and elastomeric particles. It may include particles of various sizes and/or shapes, including flat irregular shaped platelets or disc shaped particles. Plastics beads and/or or solid or hollow glass beads may also be utilized. If desired, glass beads may be coated with elastomeric material to enhance flow blockage. The screens may be provided with reinforcing ribs and/or with controlled stiffness properties which can be combined with the stiffness of the particulate matter to provide desirable flow control characteristics.

Vibration isolators embodying the present invention have been built and tested. By way of example, and not way of limitation, one such isolator having a 1.2 inch diameter passage across the partition and covered on opposite sides by a bronze shield screen having a mesh size of 30-40 holes per inch, filled to 80% of its volume with 1 mm. spherical glass beads, was subjected to tests intended to measure its performance at different amplitudes of vibrations and over a range of frequencies. The complex dynamic stiffness ($K^*$) was determined and plotted.

As best seen in FIG. 4, at low frequencies of vibration (below about 10 Hertz) the complex dynamic stiffness of the isolator was about the same whether the amplitude was 0.1 mm. or 1 mm., thereby indicating that at low frequencies, the inertia track 23 was decoupled and fluid was simply oscillating in the passage 25 between the upper and lower chambers 21 and 22. As the frequency of oscillation increased beyond about 10 Hertz, the inertia track 23 remained decoupled at an amplitude of 0.1 mm. However, at higher amplitudes, such as 1 mm., the complex stiffness of the isolator increased markedly, indicating that the particulate matter 29 was throttling flow through the passage 25 and thereby coupling the inertia track 23 to the chambers 21 and 22. Like results were obtained with cryogenically ground rubber particles of the same size.

In the course of the referenced tests, no audible noise was generated as a result of the movement of the particulate matter and its compaction within the foraminous defined cavity. Thus, not only is the vibration isolator of the present invention quiet in operation, but it is resistant to fatigue failure, thereby overcoming the limitations of both disc-type and diaphragm-type decouplers. As a result, the vibration isolator of the present invention is particularly well suited for mounting engines in automobiles.

While a preferred embodiment of the present invention has been described in detail, various modification, alterations and changes may be made without departing from the spirit and scope of the present invention as defined in the appended claims.

I claim:

1. In a vibration isolating device having a housing with at least one flexible wall portion movable in response to vibrations imparted thereto, a partition dividing the housing into at least two chambers for containing a working fluid displaceable in response to movement of the flexible wall, an inertia track passageway providing fluid communication between the chambers, and decoupling means cooperable with the inertia track passageway to control fluid flow between the chamers, the improvement wherein said decoupling means comprises passage means providing fluid communication between said chambers, a mass of particulate matter loosely contained in a said passage means, foraminous means between opposite ends of said passage means for confining said particulate matter loosely therein, said particulate matter cooperable with said fluid and said foraminous means to permit fluid to flow substantially freely in said passage means in response to vibrations of a predetermined amplitude while porgressively throttling fluid follow through said passage means in response to vibrations of greater amplitude wherein the density of said particulate matter corresponds substantially to the density of the working fluid which oscillates between the chambers.

2. A vibration isolating device according to claim 1 wherein the particulate matter has a void volume of less than about 50% of its packed volume.

3. A vibration isolating device according to claim 1 wherein the volume of the cavity occupied by the particulate matter corresponds to less than about 80% of the volume of the cavity to permit operative dispersion of the particulate matter in response to fluid flow.

4. A vibration isolating device according to claim 1 wherein the density of the particles composing said particulate matter corresponds substantially to the density of the working fluid, wherein the particulate matter has a void volume which is less than about 50% of its packed volume, and wherein the particulate matter when at rest in the cavity occupies less than about 80% of the volume of the cavity.

5. In a vibration isolating device having a housing with at least one flexible wall portion movable in response to vibrations imparted thereto, a partition dividing the housing into at least two chambers for containing a working fluid displaceable in response to movement of the flexible wall, an inertia track passageway providing fluid communication between the chambers, and decoupling means cooperable with the inertia track passageway to control fluid flow between the chambers, the improvement wherein the decoupling means comprises:

means providing a passage in fluid communication with both chambers, foraminous means defining in said passage means a cavity having a predetermined volume, a mass of particulate matter occupying less than said volume of the cavity and loosely contained in said cavity for providing therethrough a fluid flow path having a variable resistance to flow between the chambers, said particulate matter being displaceable by said fluid between a dispersed condition substantially disengaged from said foraminous means to provide low resistance to fluid flow between the chambers and a compacted condition engaged with said foraminous means to provide high resistance to fluid flow between the chambers, said particulate matter being composed of particles of a predetermined density and void volume, whereby the particulate matter cooperates with the foraminous means and fluid to couple and decouple the inertia track passageway without generating audible noise.

6. In a vibration isolating device having a housing with at least one flexible wall portion movable in response to vibrations imparted thereto, a partition dividing the housing into at least two chambers for containing a working fluid displaceable in response to movement of the flexible wall, an inertia track passageway providing fluid communication between the chambers, and decoupling means cooperable with the inertia track passageway to control fluid flow between the chambers, the improvement wherein the decoupling means comprises:

passage means in said partition providing fluid communication between said chambers, foraminous means provided at spaced locations in said passage means for defining a cavity having a predetermined volume in said passage means, a mass of particulate matter contained within said cavity and occupying less than said volume when at rest therein, the particles composing said particulate matter having a density corresponding substantially to the density of the working fluid, said particulate matter being movable in said cavity in response to fluid movement therein between a dispersed condition providing minimum resistance to fluid flow and a compacted condition in engagement with said foraminous means providing maximum resistance to fluid flow, whereby the vibration isolator functions quietly over a range of vibration frequencies and amplitudes.

7. In a vibration isolating device having a housing with at least one flexible wall portion movable in response to vibrations imparted thereto, a partition dividing the housing into at least two chambers for containing a working fluid displaceable in response to movement of the flexible wall, an inertia track passageway providing fluid communication between the chambers, and decoupling means cooperable with the inertia track passageway to control fluid flow between the chambers, the improvement wherein the decoupling means comprises:

passage means in said partition providing fluid communication between said chambers, a pair of foraminous means mounted in said partition at spaced locations in said passage means to define therein a cavity having a predetermined volume, a mass of particulate matter loosely contained in said cavity and when at rest occupying less than the volume thereof, said particulate matter having a predetermined density and void volume for cooperating with said working fluid to assume a dispersed condition within said providing a minimum resistance to fluid flow through the passage means at low amplitudes of vibrations and to assume a compacted condition in engagement alternately with said pair of foraminous means at higher amplitudes of vibrations whereby the inertia track passageway is coupled and decoupled positively and quietly.

8. The vibration isolating device according to claim 7 wherein said particulate matter occupies less than about 80% of the volume of said cavity when at rest therein and comprises particles having a density corresponding substantially to the density of the working fluid and a void volume of less than about 50% of the packed volume of the particulate matter.

9. The vibration isolating device according to claim 7 where said mass of particulate matter includes particles selected from the group comprising: glass, plastic, elastomeric, and mineral materials.

10. The vibration isolating device according to claim 7 wherien said mass of particulate matter includes homogeneous particles.

11. The vibration isolator according to claim 7 wherein said mass of particulate matter includes glass spheres about 1 mm. in diameter.

12. The vibration isolating device according to claim 7 wherein said mass of particulate matter includes non-homogeneous mixture of different types of particles.

13. The vibration isolating device according to claim 7 wherein said mass of particulate matter includes particles of various sizes and/or shapes.

14. In a vibration isolating device having a housing with at least one flexible wall portion movable in response to vibrations imparted thereto, a partition dividing the housing into at least two chambers for containing a working fluid displaceable in response to movement of the flexible wall, an inertia track passageway providing fluid communication between the chambers, and decoupling means cooperable with the inertia track passageway to control fluid flow between the chambers, the improvement wherein said decoupling means comprises passage means providing fluid communication between said chambers, a mass of particulate matter loosely contained in a said passage means, foraminous means between opposite ends of said passage means for confining said particulate matter loosely therein, said particulate matter cooperable with said fluid and said foraminous means to permit fluid to flow substantially freely in said passage means and through said mass of particluate matter in response to vibrations of a predetermined amplitude while progressively throttling fluid flow through said passage means in response to vibrations of greater amplitude wherein the density of said particulate matter corresponds substantially to the density of the working fluid which oscillates between the chambers.

15. A vibration isolating device according to claim 14 wherein the particulate matter has a void volume of less than about 50% of its packed volume.

16. A vibration isolating device according to claim 14 wherein the volume of the cavity occupied by the particulate matter corresponds to less than about 80% of the volume of the cavity to permit operative dispersion of the particulate matter in response to fluid flow.

17. A vibration isolating device according to claim 14 wherein the density of the particles composing said particulate matter corresponds substantially to the density of the working fluid, wherein the particulate matter has a void volume which is less than about 50% of its packed volume, and wherein the particulate matter when at rest in the cavity occupies less than about 80% of the volume of the cavity.

* * * * *